United States Patent
Jung

(10) Patent No.: US 7,756,554 B2
(45) Date of Patent: Jul. 13, 2010

(54) DIVERSELY OPENABLE DUAL DISPLAY TYPE MOBILE COMMUNICATION TERMINAL

(75) Inventor: Tae kyung Jung, Suwon-si (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 11/371,977

(22) Filed: Mar. 8, 2006

(65) Prior Publication Data

US 2006/0205438 A1 Sep. 14, 2006

(30) Foreign Application Priority Data

Mar. 10, 2005 (KR) .................. 10-2005-0020270

(51) Int. Cl.
*H04M 1/00* (2006.01)
(52) U.S. Cl. .............. 455/575.3; 455/575.4; 455/575.1; 455/566; D14/248; D14/240; D14/345; D14/250
(58) Field of Classification Search .............. 455/575.1, 455/575.2, 575.3, 456.1, 456.3, 456.4, 566, 455/556.2; D14/138 R, 138 AB, 138 AD, D14/138 AA, 140, 345, 240, 250
See application file for complete search history.

(56) References Cited

U.S. PATENT DOCUMENTS

| 7,359,721 | B2 * | 4/2008 | Gay et al. ................... 455/466 |
| 7,447,527 | B2 * | 11/2008 | Lin et al. ................. 455/575.1 |
| 2005/0107137 | A1 * | 5/2005 | Byun et al. .............. 455/575.1 |
| 2005/0264984 | A1 * | 12/2005 | Lee ............................ 361/681 |
| 2005/0266897 | A1 * | 12/2005 | Ahn et al. ................ 455/575.1 |

FOREIGN PATENT DOCUMENTS

DE 3323858 A * 1/1985

* cited by examiner

*Primary Examiner*—Erika A Gary
*Assistant Examiner*—Pierre-Louis Desir
(74) *Attorney, Agent, or Firm*—Lee, Hong, Degerman, Kang & Waimey

(57) ABSTRACT

A diversely openable dual display type mobile communication terminal is disclosed. The mobile communication terminal is designed in due consideration of a design concept and a form factor to facilitate enhanced information input that includes a plurality of discrete information input parts separately formed on a key group in order to provide broadened information input areas, the input parts selectively openable by use of a folder portion and a slider portion.

20 Claims, 8 Drawing Sheets

DIVERSELY OPENABLE DUAL DISPLAY TYPE MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 2005-0020270, filed on Mar. 10, 2005, the contents of which is hereby incorporated by reference herein in its entirety

BACKGROUND OF THE INVENTION

1. Field of the Invention

The present invention relates to a mobile communication terminal such as a mobile phone and, more particularly, to a diversely openable dual display type mobile communication terminal that accommodates a design concept and a form factor and includes a plurality of discrete information input parts separately formed on a key group in order to provide broadened information input areas, the input parts selectively openable by use of a folder portion and a slider portion.

2. Description of the Related Art

Along with the advancement of mobile communication technology, a personal mobile communication terminal such as a mobile phone has evolved into a multi-functional, intelligent, sophisticated and versatile device. There is an increasing trend to market versatile mobile communication terminals capable of not only performing voice communication, but also providing new multimedia-based information services related to games, video-on-demand, an electronic dictionary, an MP3, a variety of data and moving images.

Such versatile mobile communication terminals incorporate a variety of collateral functions in a single unit and arouse a growing interest in consumers due to their convenience of use, functionality and design. As an example of a versatile mobile communication terminal, a horizontally viewed terminal has been developed in order to accommodate improved multimedia functions and address the increasing demand for moving image information services. Such state-of-the-art mobile communication terminals are designed and produced in due consideration of what is called a form factor to thereby attain great improvement in design and functionality.

Referring to FIG. 1, a schematic illustration of a prior art mobile communication terminal 100 is shown. The mobile communication terminal 100 includes a main body 110, a display 111 arranged on the front of the main body for displaying various images, an antenna 170 for transmitting and receiving communication signals and a data input area 130 to enable a user to input a variety of data.

The data input area 130 typically includes character input keys 131 for entering general characters, special characters and symbols as well as character/numeral combination keys 132 for entering numerals together with characters. Since the character input keys 131 and the character/numeral combination keys 132 are located on a single narrow board in a crowded condition, the conventional mobile communication terminal is inherently inconvenient to use.

Therefore, there is a need for a mobile communication terminal that facilitates convenient use of a plurality of keys adopted to enter various characters.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention is directed to providing a diversely openable dual display type mobile communication terminal designed in due consideration of a design concept and a form factor to facilitate enhanced information input. The present invention is further directed to providing a diversely openable dual display type mobile communication terminal designed in due consideration of a design concept and a form factor to enhance in-use convenience, functionality and design, thereby keeping pace with the increasing versatility of a mobile communication terminal.

A further object of the present invention is to provide a diversely openable dual display type mobile communication terminal that includes a qwerty type keyboard having enhanced information input capability. Another object of the present invention is to provide a diversely openable dual display type mobile communication terminal that has a plurality of discrete information input devices separately formed as a key group in order to facilitate enhanced information input capability and that is selectively openable by use of a folder portion and a slider portion.

In one aspect of the present invention, a mobile communication terminal is provided. The mobile communication terminal includes a main body portion including a first information input area and a second information input area, the first and second information input areas located in mutually separated adjoining regions on a surface of the main body portion, a folder portion rotatably attached to the main body portion and having an open configuration and a closed configuration such that the first information input area is covered by the folder portion when the folder portion is in the closed configuration and a slider portion slidably attached to the main body portion and having an open configuration and a closed configuration such that the second information input area is covered when the slider portion is in the closed configuration.

It is contemplated that the first information input area includes a character/symbol input keypad. It is further contemplated that the character/symbol input keypad is a qwerty type keyboard. Preferably, the character/symbol input keypad occupies 65%-75% of a total area of the first information input area and the second information input area.

It is contemplated that the second information input area includes an Arabic numeral input keypad. Preferably, the Arabic numeral input keypad occupies 25%-35% of a total area of the first information input area and the second information input area.

It is contemplated that the folder portion includes dual displays, the dual displays located on opposite surfaces such that the mobile communication terminal has a primary display panel and a secondary display panel. Preferably, the main display panel and the sub display panel are adapted to display, respectively, image information of different menus.

It is contemplated that the folder portion is adapted to open in two steps, each of the two steps having a different rotation angle such that the folder portion has a first open configuration and a second open configuration. It is further contemplated that the main body portion includes a two-step hinge unit for rotatably attaching the folder portion to the main body portion. Preferably, the first open configuration has a rotation angle of 150°±5° and the second open configuration has a rotation angle of 180°±5°.

It is contemplated that the slider portion includes a menu selection input keypad. It is further contemplated that a rear surface of the main body portion includes a lens of a camera module such that the camera module lens remains exposed to the outside. Preferably, the folder portion includes dual displays, the dual displays located on opposite surfaces such that the mobile communication terminal has a primary display panel and a secondary display panel and image information captured by the camera module is selectively displayed either the primary display panel or the secondary display panel.

It is contemplated that the main body portion further includes a built-in antenna. It is further contemplated that the mobile communication terminal further includes a slide unit adapted to slidably support the slider portion, the slide unit located between the slider portion and the main body portion. Preferably, the slide unit includes a support bracket secured to the slider portion in a face-to-face relationship, a pair of guide bars at opposite lateral ends of the support bracket, the guide bars in a spaced-apart parallel relationship with each other and a support plate comprising a pair of holders slidably coupled with the pair of guide bars, the support plate secured to the main body portion in a face-to-face relationship.

In another aspect of the present invention, a mobile communication terminal is provided. The mobile communication terminal includes a main body portion having a first information input area and a second information input area, the first and second information input areas located in mutually separated adjoining regions on a surface of the main body portion, the first information input area including a character/symbol input keypad and the second information input part including an Arabic numeral input keypad, a folder portion rotatably attached to the main body portion and having an open configuration and a closed configuration such that the first information input area is covered by the folder portion when the folder portion is in the closed configuration, the folder portion including dual displays, the dual displays located on opposite surfaces and a slider portion slidably attached to the main body portion and having an open configuration and a closed configuration such that the second information input area is covered when the slider portion is in the closed configuration, the slider portion including a menu selection input keypad.

In another aspect of the present invention, a mobile communication terminal is provided. The mobile communication terminal includes a main body portion having a first information input area and a second information input area, the first and second information input areas located in mutually separated adjoining regions on a surface of the main body portion, a folder portion rotatably attached to the main body portion and having an open configuration and a closed configuration such that the first information input area is covered by the folder portion when the folder portion is in the closed configuration, the folder portion including a primary display panel and a secondary display panel, the primary display panel and secondary display panel located on opposite surfaces, a slider portion slidably attached to the main body portion and having an open configuration and a closed configuration such that the second information input area is covered when the slider portion is in the closed configuration and a camera module including a lens mounted on a rear surface of the main body portion such that the lens remains exposed to the outside and image information captured by the camera module is selectively displayed on either the primary display panel or the secondary display panel.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
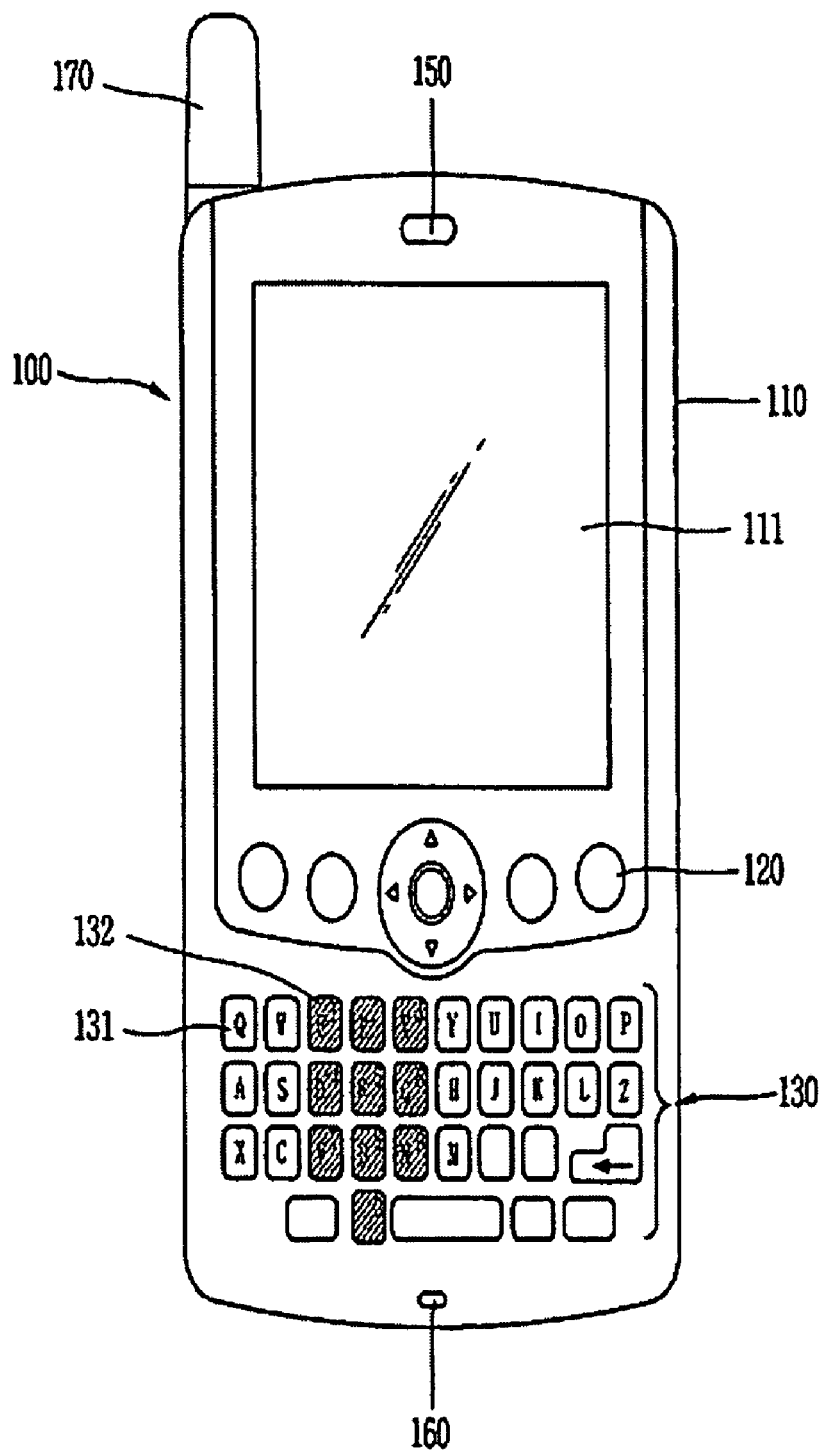
FIG. 1 is a schematic view of a prior art mobile communication terminal.

The present invention is directed to a diversely openable dual display type mobile communication terminal designed in due consideration of a design concept and a form factor to facilitate enhanced information input that includes a plurality of discrete information input parts separately formed on a key group in order to provide broadened information input areas, the input parts selectively openable by use of a folder portion and a slider portion. Although the present invention is illustrated with respect to a mobile communication device, it is contemplated that the present invention may be utilized anytime it is desired to facilitate convenient use of a plurality of keys adopted to enter various characters.

Preferred embodiments of a diversely openable dual display type mobile communication terminal according to the present invention will be described in detail with reference to the accompanying drawings. Referring to FIGS. 2 through 7, a diversely openable dual display type mobile communication terminal 200 according to the present invention includes a main body portion 210, a folder portion 220 and a slider portion 230.

The main body portion 210 is a box-like rectangular case and incorporates a number of electrical devices (not shown), for example, a printed circuit board on which electronic components, such as semiconductor chips for processing entered information and communication signals, are mounted. The main body portion 210 has a first information input area 211A and a second information input area 212A located, respectively, in mutually separated adjoining regions on a surface of the main body portion 210. The main body portion 210 is also provided with a built-in antenna (not shown).

The first information input area 211A is provided with a character/symbol input keypad 211 forming a discrete region where input keys, such as alphabet characters and symbols, are grouped together. Preferably, the character/symbol input keypad 211 is a qwerty type keyboard. The second information input area 212A is provided with an Arabic numeral input keypad 212.

Preferably, the character/symbol input keypad 211 occupies 65-75% of the total area of the first and second information input areas 211A, 212A. It is further preferred is that the Arabic numeral input keypad 212 occupies 25-35% of the total area of the first and second information input area 211A, 212A.

The folder portion 220 is rotatably attached to the main body portion 210 for opening and closing the character/symbol input keypad 211 of the first information input area 211A. Furthermore, the folder portion 220 is provided with a main display panel 221 and a sub display panel 222 at opposite surfaces, thereby forming a dual display folder. The main display panel 221 and the sub display panel 222 are adapted to display image information of different menus.

The folder portion 220 is large enough to cover the character/symbol input keypad 211 of the first information input area 211A, thereby allowing the folder portion 220 to have a wider display panel. The slider portion 230 is slidably attached to the main body portion 210 such that it can cover the Arabic numeral input keypad 212 of the second information input area 212A.

Figure 5:
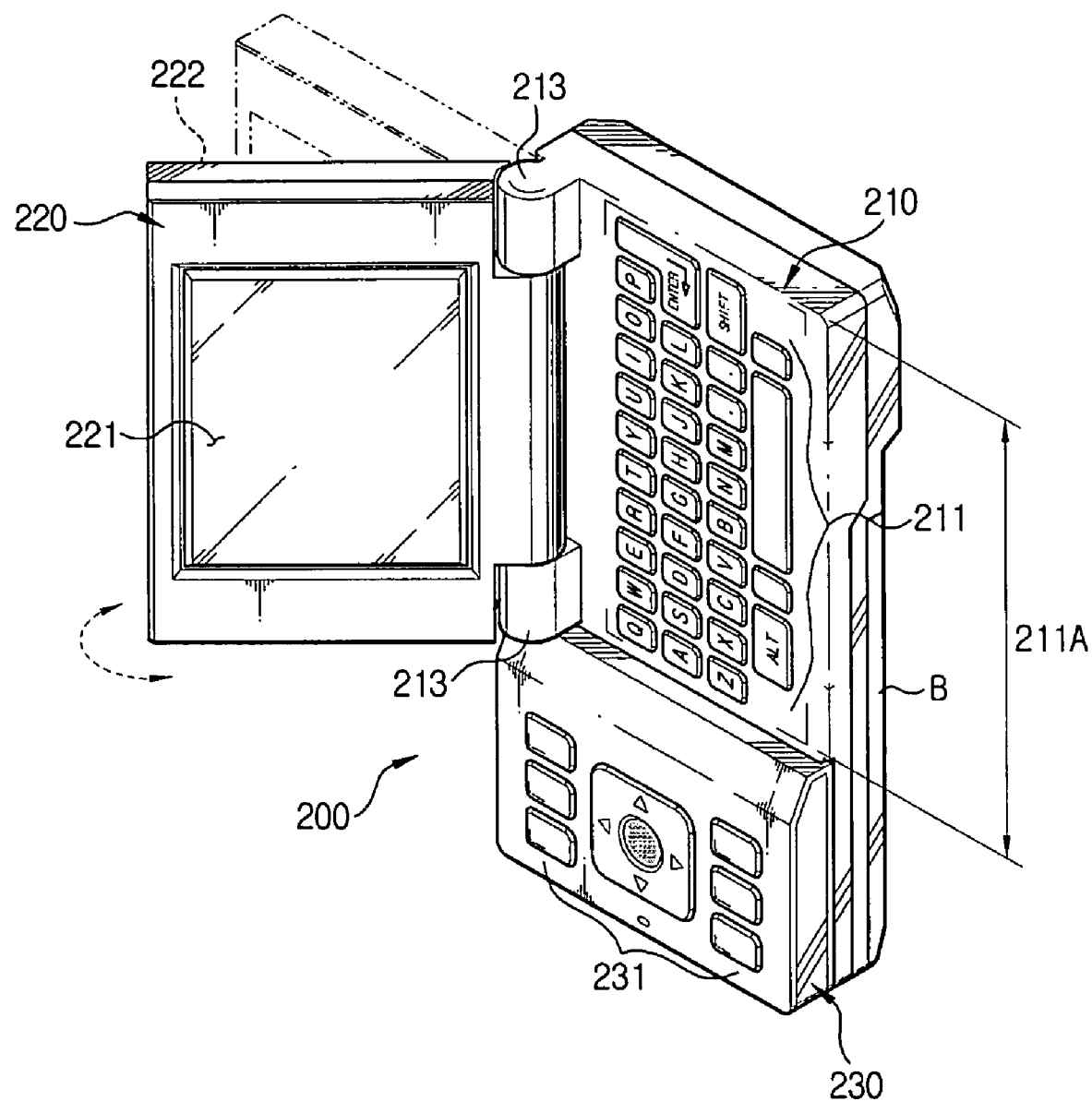

The folder portion 220 is rotatably coupled with a two-step hinge unit (not shown) so that it can be opened and closed in two steps. The hinge unit is fitted to pivot brackets 213 protruding from one corner of the main body portion 210. The hinge unit is not subject to any limitation and may be any hinge unit known in the art that operates in two steps. It is preferred that the folder portion 220 is opened and closed into a first configuration having an open angle of 150±5° and a second configuration having an open angle of 180±5°, as illustrated in FIG. 5.

Figure 7:
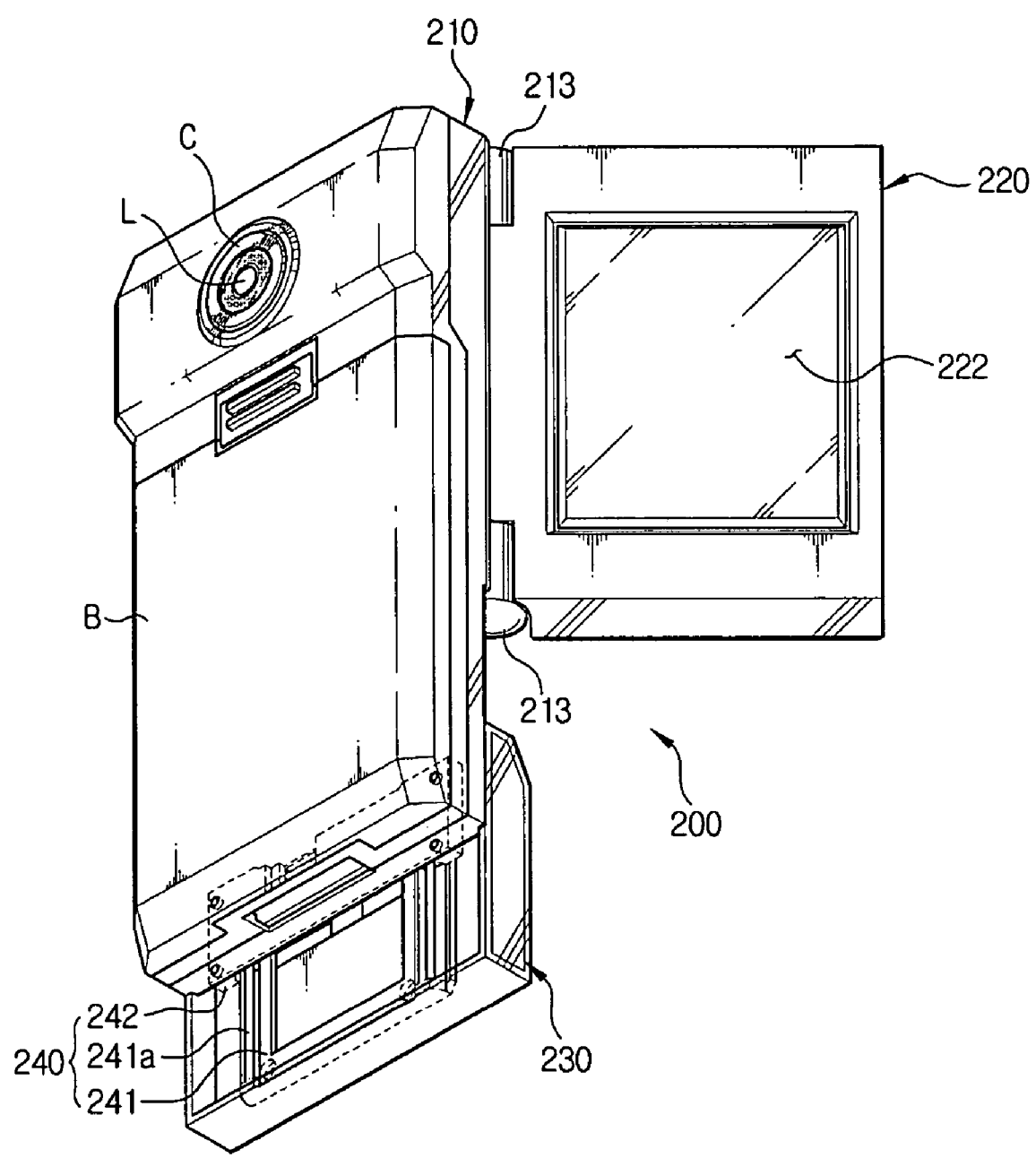
Figure 8:
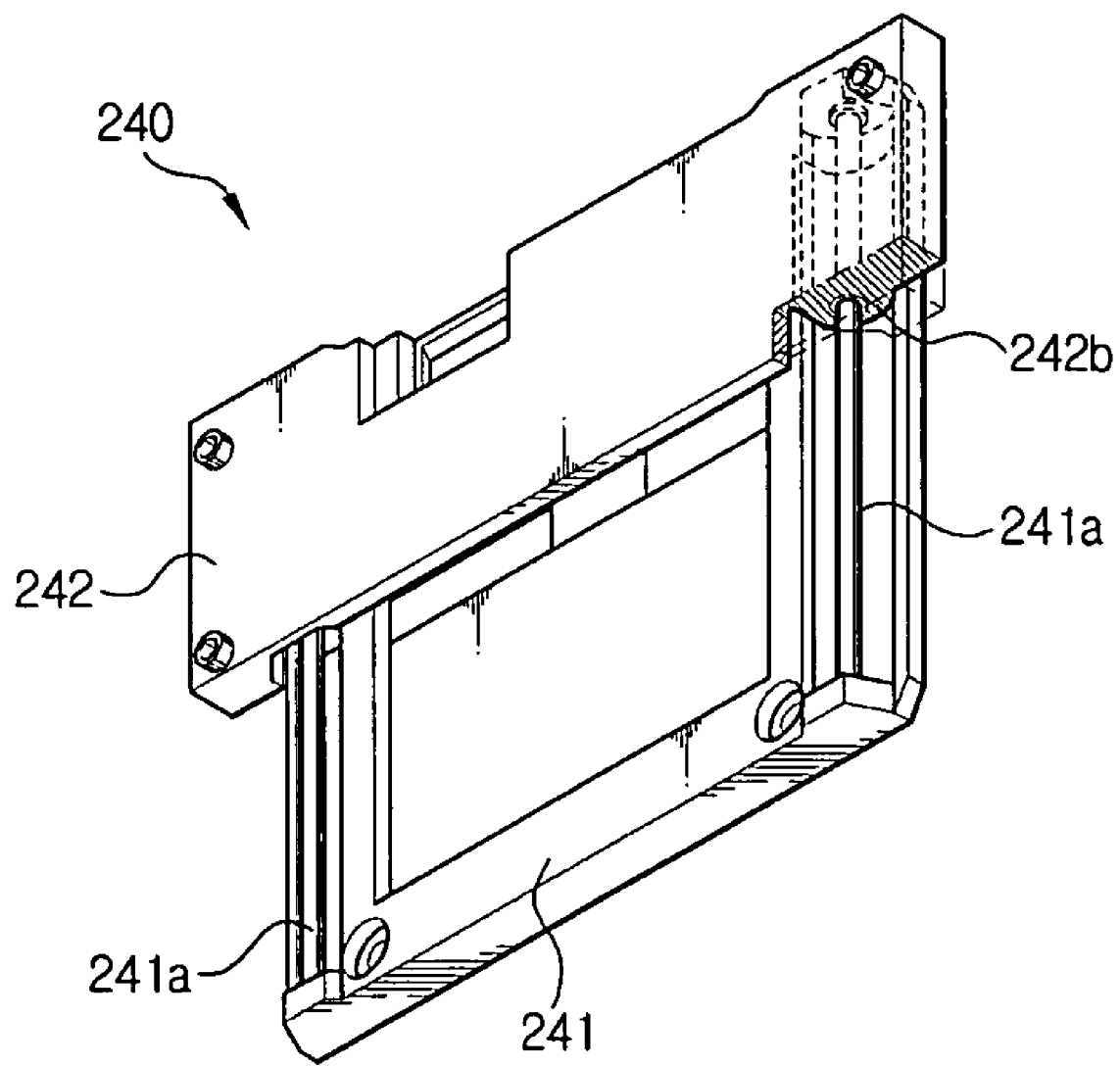
FIG. 8 is a perspective view illustrating a slide unit employed in a diversely openable dual display type mobile communication terminal according to one embodiment of the present invention.

As illustrated in FIGS. 7 and 8, a slide unit 240 is provided between the main body portion 210 and the slider portion 230 such that the slider portion 230 is slidably supported. The slide unit 240 includes a plate-like support bracket 241 secured to a back side of the slider portion 230 in a face-to-face relationship and a planar support plate 242 secured to the lower part of a front surface of the main body portion 210 in a face-to-face relationship.

A pair of guide bars 241a are provided at opposite lateral ends of the support bracket 241 in a spaced-apart parallel relationship to each other. A pair of holders 242b are formed in the support plate 242 and coupled with the pair of guide bars 241a to slidably support the guide bars.

The slider portion 230 is provided with a menu selection input keypad 231 that remains exposed to the outside. Furthermore, a lens L of a camera module C is attached to a rear surface of the main body portion 210 such that the lens L remains exposed to the outside. Image information captured by the camera module C is displayed on the main display panel 221, but optionally may be displayed on the sub display panel 222. A battery pack is also provided.

Use of the diversely openable dual display type mobile communication terminal according to the present invention will be described with reference to FIGS. 2-7.

Figure 3:
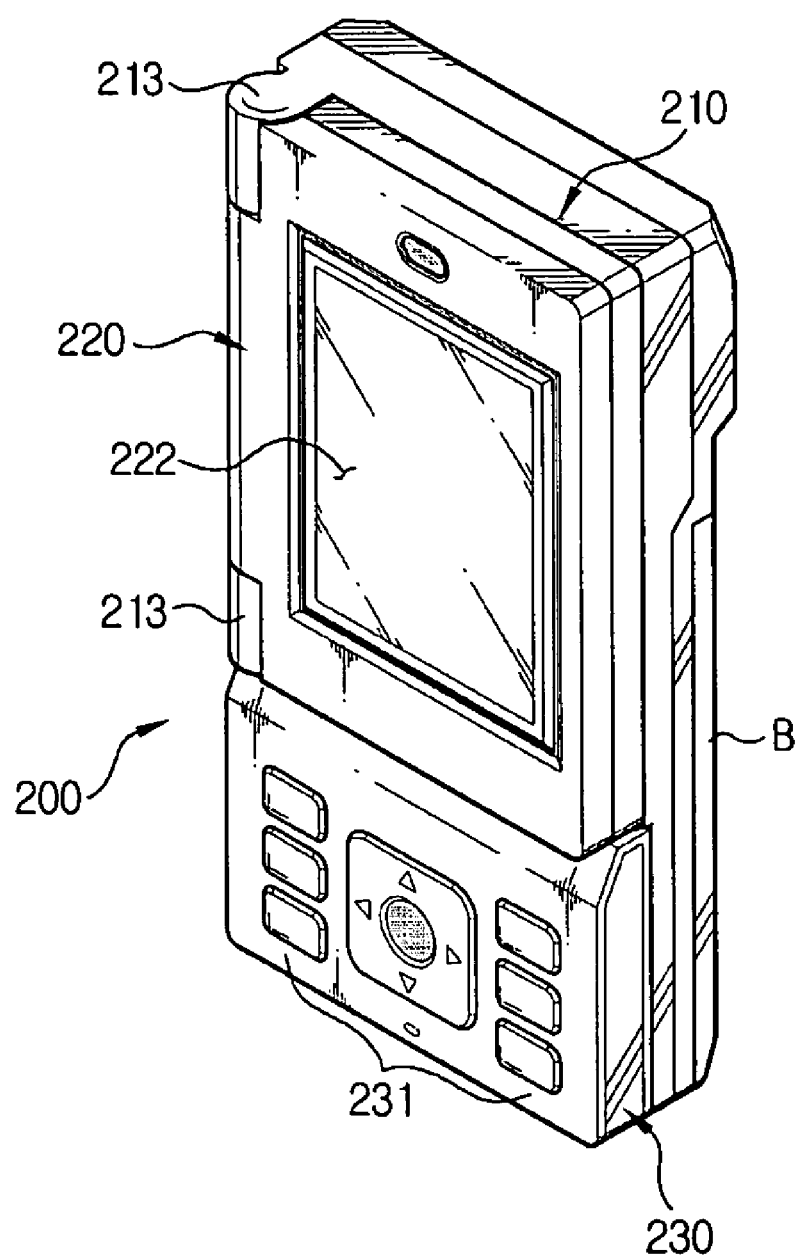
Figure 4:
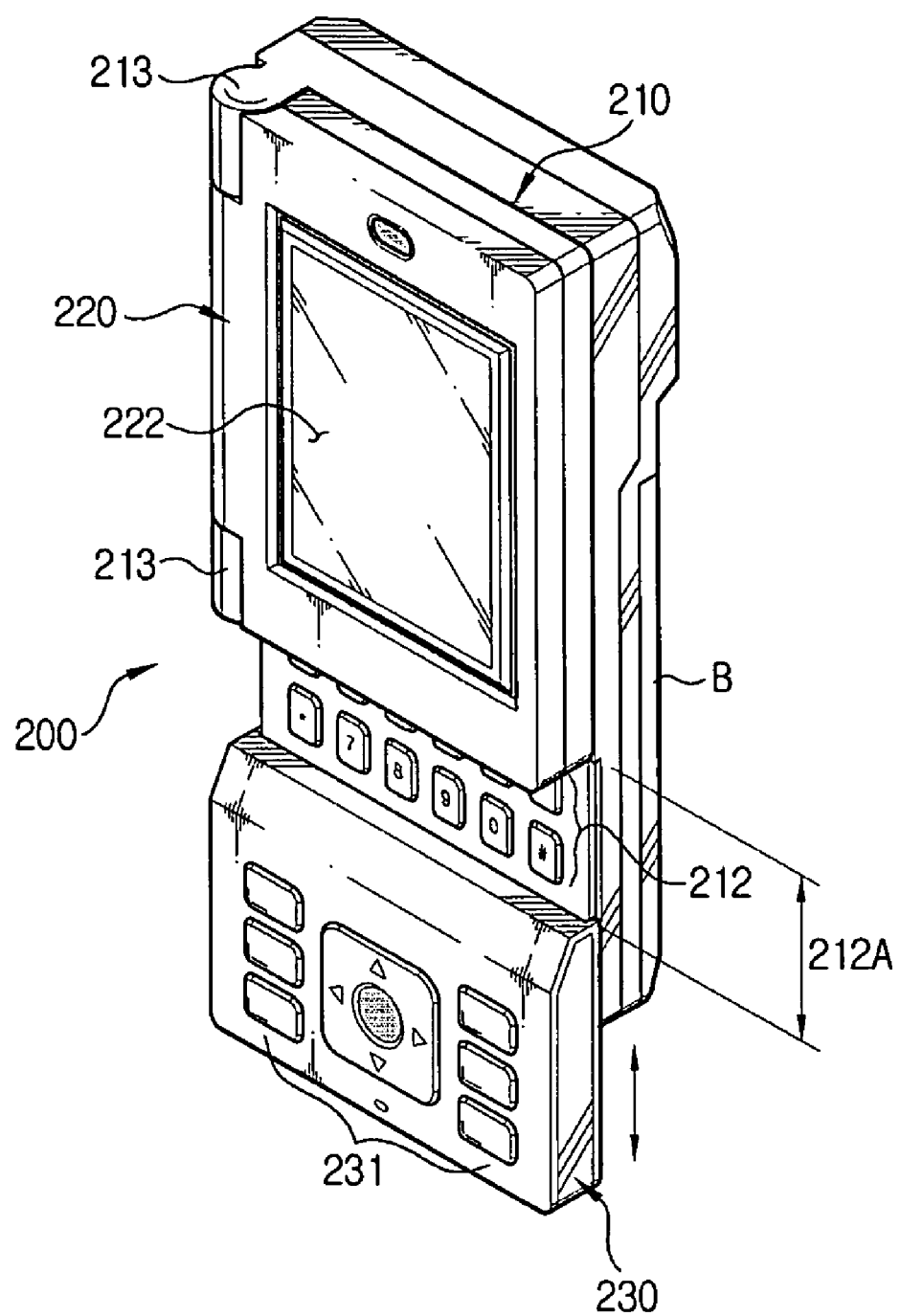

FIG. 3 illustrates the mobile communication terminal 200 in an out-of-use or storage configuration in which the folder portion 220 and the slider portion 230 are closed in contact with the front surface of the main body portion 210 to thereby cover the first information input area 211A and the second information input area 212A, respectively, thereby maintaining the mobile communication terminal in a compact state. FIG. 4 illustrates the mobile communication terminal 200 in a voice communication configuration in which the slider portion 230 is moved downward into an open position to expose the second information input area 212A, thereby allowing a user to input, for example, a receiver identification number. In the voice communication configuration, a user may manipulate the menu selection input keypad 231 of the slider portion 230 and the Arabic numeral input keypad 212 of the second information input area 212A to enter the receiver identification number.

FIG. 5 illustrates a configuration where, for example, a user conducts an image information communication, such as transmitting and receiving information related to games or other moving images. As illustrated in FIG. 5, the folder portion 220 is rotated and opened toward a side of the main body portion 210 to uncover the first information input area 211A and the main display panel 221.

The configuration illustrated in FIG. 5 enables a user to view the image information displayed on the main display panel 221 while manipulating the menu selection input keypad 231 of the slider portion 230 and the qwerty type character/symbol input keypad 211 of the first information input area 211A. In this way, the user may view the image information while selectively rotating the folder portion 220 into a first configuration having an open angle of 150±5° and a second configuration having an open angle of 180±5° with respect to the front surface of the main body portion 210. The configuration of the folder portion 220 may be selected at the user's discretion when the mobile communication terminal 200 is used as a laptop computer or a desktop computer.

Figure 2:
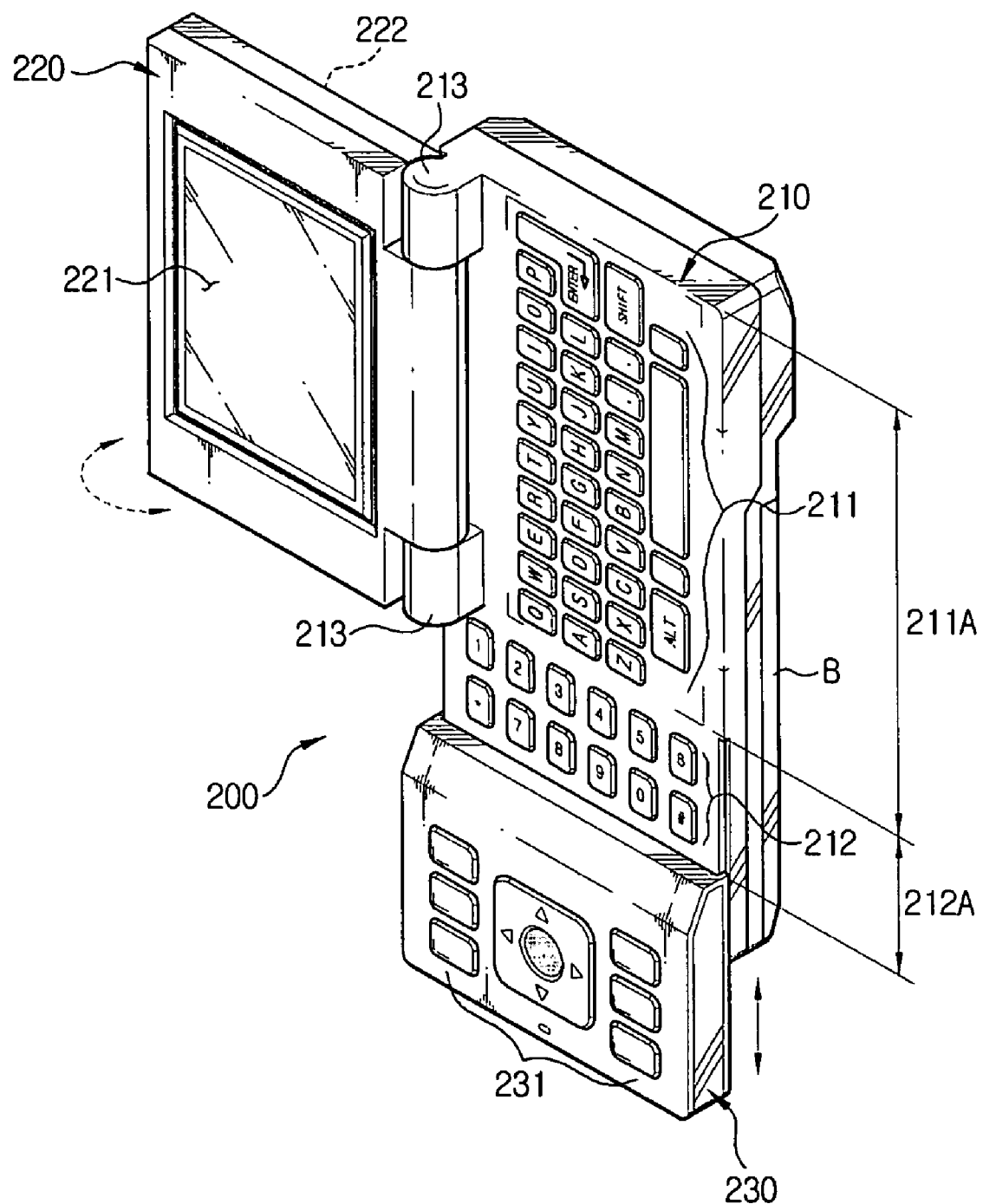
FIGS. 2 through 7 are perspective views illustrating a diversely openable dual display type mobile communication terminal according to embodiments of the present invention.
Figure 6:
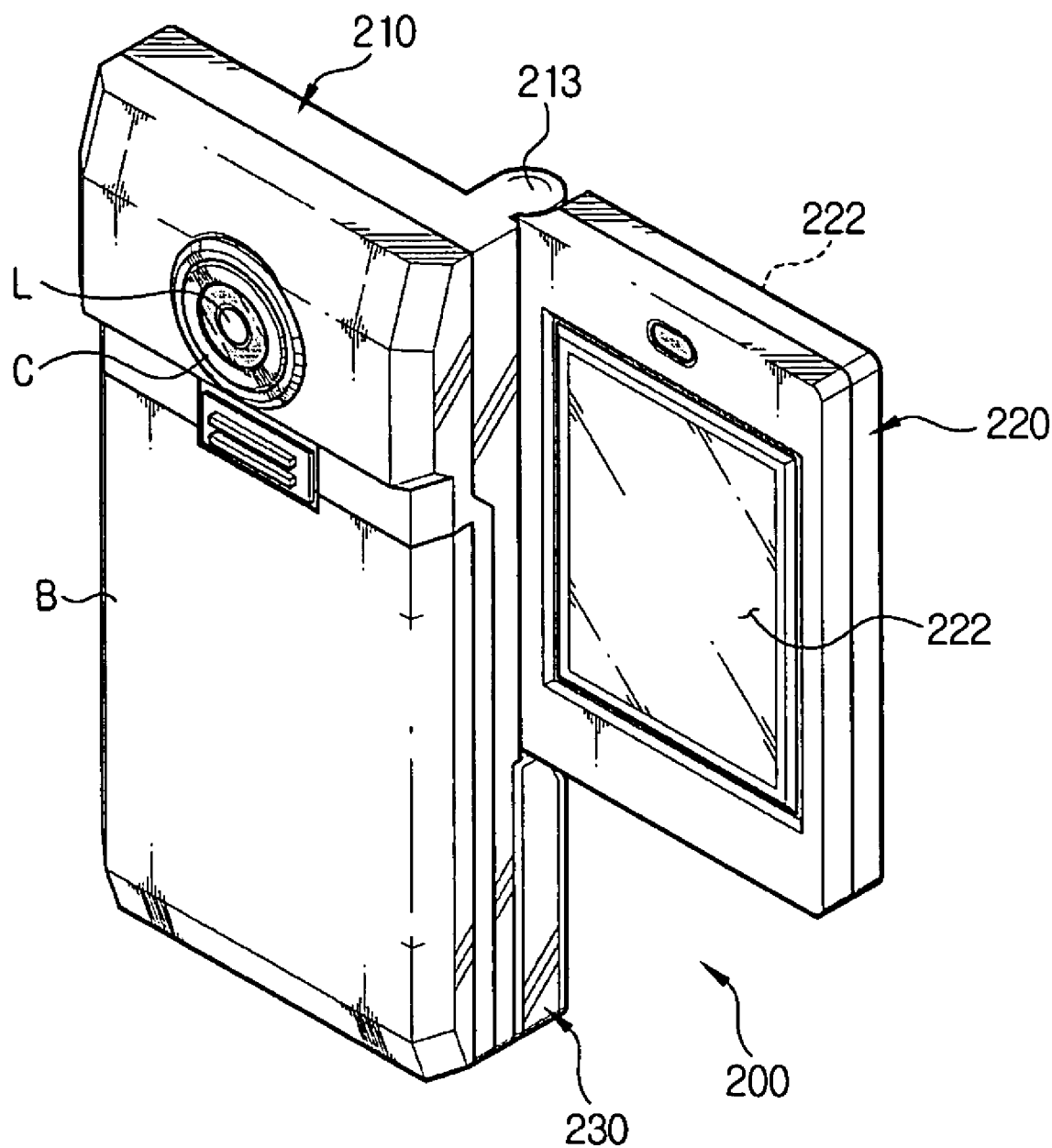

FIG. 6 illustrates the mobile communication terminal 200 in an image-taking configuration. In this configuration, the folder portion 220 is opened into the second configuration having an open angle of 180±5° such that the user can easily observe the image information captured by the camera module C and displayed on the main display panel 221 or the sub display panel 222. FIGS. 2 and 7 illustrate the mobile communication terminal 200 with the folder portion 220 and the slider portion 230 both in their open positions to enable the user to use each and every operation mode provided by the mobile communication terminal 200 according to the present invention.

As described in the foregoing, the diversely openable dual display type mobile communication terminal according to the present invention includes a qwerty type character/symbol input keypad and an Arabic numeral input keypad separately formed on a broadened information area, thereby greatly improving convenience when entering information data. Furthermore, the mobile communication terminal according to the present invention is designed in due consideration of a form factor, thereby helping to enhance in-use convenience, functionality and design and keeping pace with the increasing versatility of a mobile communication terminal. Moreover, in the mobile communication terminal according to the present invention, a folder portion is enlarged to a size great enough to effectively cover a broadened information input area, thereby allowing the folder portion to have a wider display panel.

Although certain preferred embodiments of the present invention have been described herein above, it will be apparent to those skilled in the art that various changes or modifications may be made thereto within the scope of the invention defined by the appended claims.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal, comprising:
a main body portion comprising a first information input area and a second information input area, the first and second information input areas located in mutually separated adjoining regions on a surface of the main body portion;
a folder portion rotatably attached to the main body portion and having an open configuration and a closed configuration such that only the first information input area is covered by the folder portion when the folder portion is in the closed configuration; and
a slider portion slidably attached to the main body portion and having an open configuration and a closed configuration such that only the second information input area is covered when the slider portion is in the closed configuration, wherein the slider portion partially covers the surface of the main body portion in the open configuration.

2. The mobile communication terminal of claim 1, wherein the first information input area comprises a character/symbol input keypad.

3. The mobile communication terminal of claim 2, wherein the character/symbol input keypad is a qwerty type keyboard.

4. The mobile communication terminal of claim 2, wherein the character/symbol input keypad occupies 65%-75% of a total area of the first information input area and the second information input area.

5. The mobile communication terminal of claim 1, wherein the second information input area comprises an Arabic numeral input keypad.

6. The mobile communication terminal of claim 5, wherein the Arabic numeral input keypad occupies 25%-35% of a total area of the first information input area and the second information input area.

7. The mobile communication terminal of claim 1, wherein the folder portion comprises dual displays, the dual displays located on opposite surfaces such that the mobile communication terminal comprises a primary display panel and a secondary display panel.

8. The mobile communication terminal of claim 7, wherein the primary display panel and the secondary display panel are adapted to display, respectively, image information of different menus.

9. The mobile communication terminal of claim 1, wherein the folder portion is adapted to open in two steps, each of the two steps comprising a different rotation angle such that the folder portion has a first open configuration and a second open configuration.

10. The mobile communication terminal of claim 9, wherein the main body portion comprises a two-step hinge unit for rotatably attaching the folder portion to the main body portion.

11. The mobile communication terminal of claim 10, wherein the first open configuration comprises a rotation angle of 150°±5° and the second open configuration comprises a rotation angle of 180°±5°.

12. The mobile communication terminal of claim 1, wherein the slider portion comprises a menu selection input keypad.

13. The mobile communication terminal of claim 1, wherein a rear surface of the main body portion comprises a lens of a camera module such that the camera module lens remains exposed to the outside.

14. The mobile communication terminal of claim 13, wherein the folder portion comprises dual displays, the dual displays located on opposite surfaces such that the mobile communication terminal comprises a primary display panel and a secondary display panel.

15. The mobile communication terminal of claim 14, wherein image information captured by the camera module is selectively displayed on one of the primary display panel and the secondary display panel.

16. The mobile communication terminal of claim 1, wherein the main body portion further comprises a built-in antenna.

17. The mobile communication terminal of claim 1, further comprising a slide unit adapted to slidably support the slider portion, the slide unit located between the slider portion and the main body portion.

18. The mobile communication terminal of claim 17, wherein the slide unit comprises:
a support bracket secured to the slider portion in a face-to-face relationship;
a pair of guide bars at opposite lateral ends of the support bracket, the guide bars in a spaced-apart parallel relationship with each other; and
a support plate comprising a pair of holders slidably coupled with the pair of guide bars, the support plate secured to the main body portion in a face-to-face relationship.

19. A mobile communication terminal, comprising:
a main body portion comprising a first information input area and a second information input area, the first and second information input areas located in mutually separated adjoining regions on a surface of the main body portion, the first information input area comprising a character/symbol input keypad and the second information input part comprising an Arabic numeral input keypad;
a folder portion rotatably attached to the main body portion and having an open configuration and a closed configuration such that only the first information input area is covered by the folder portion when the folder portion is in the closed configuration, the folder portion comprising dual displays located on opposite surfaces; and
a slider portion slidably attached to the main body portion and having an open configuration and a closed configuration such that only the second information input area is covered when the slider portion is in the closed configuration, the slider portion comprising a menu selection input keypad, wherein the slider portion partially covers the surface of the main body portion in the open configuration.

20. A mobile communication terminal, comprising:

a main body portion comprising a first information input area and a second information input area, the first and second information input areas located in mutually separated adjoining regions on a surface of the main body portion;

a folder portion rotatably attached to the main body portion and having an open configuration and a closed configuration such that only the first information input area is covered by the folder portion when the folder portion is in the closed configuration, the folder portion comprising a primary display panel and a secondary display panel, the primary display panel and secondary display panel located on opposite surfaces;

a slider portion slidably attached to the main body portion and having an open configuration and a closed configuration such that only the second information input area is covered when the slider portion is in the closed configuration, wherein the slider portion partially covers the surface of the main body portion in the open configuration; and a camera module comprising a lens mounted on a rear surface of the main body portion such that the lens remains exposed to the outside, wherein image information captured by the camera module is selectively displayed on one of the primary display panel and the secondary display panel.

* * * * *